(12) United States Patent
Rajendran Sathyam et al.

(10) Patent No.: US 12,220,984 B2
(45) Date of Patent: Feb. 11, 2025

(54) USER PERSPECTIVE ALIGNMENT FOR VEHICLE SEE-THROUGH APPLICATIONS

(71) Applicant: Panasonic Automotive Systems Company of America, Division of Panasonic Corporation of North America, Peachtree City, GA (US)

(72) Inventors: Rajendramayavan Rajendran Sathyam, Peachtree City, GA (US); Jin Woo Jung, Johns Creek, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 487 days.

(21) Appl. No.: 17/548,378

(22) Filed: Dec. 10, 2021

(65) Prior Publication Data

US 2022/0203833 A1   Jun. 30, 2022

Related U.S. Application Data

(60) Provisional application No. 63/133,052, filed on Dec. 31, 2020.

(51) Int. Cl.
| | |
|---|---|
| *B60K 35/00* | (2024.01) |
| *B60W 40/08* | (2012.01) |
| *G06F 3/01* | (2006.01) |
| *G06V 20/59* | (2022.01) |
| *G06V 40/18* | (2022.01) |
| *B60K 35/10* | (2024.01) |
| *B60K 35/28* | (2024.01) |

(52) U.S. Cl.
CPC ............ *B60K 35/00* (2013.01); *B60W 40/08* (2013.01); *G06F 3/013* (2013.01); *G06V 20/597* (2022.01); *G06V 40/18* (2022.01);

*B60K 35/10* (2024.01); *B60K 35/28* (2024.01); *B60K 2360/149* (2024.01); *B60K 2360/176* (2024.01);
(Continued)

(58) Field of Classification Search
CPC ........ B60K 35/00; B60K 35/10; B60K 35/28; B60K 35/22; B60K 2360/149; B60K 2360/176; B60K 2360/31; B60K 2360/1523; B60K 2360/21; B60W 40/08;
(Continued)

(56) References Cited

U.S. PATENT DOCUMENTS 8,547,298 B2 * 10/2013 Szczerba ............... G01S 13/867
340/436
10,981,507 B1 * 4/2021 Benjamin ........... B60R 16/0232
(Continued)

*Primary Examiner* — Christopher E Leiby
(74) *Attorney, Agent, or Firm* — Laurence S. Roach, Esq.

(57) ABSTRACT

Examples of the disclosure relate to example systems and methods for operating a see-through display for a vehicle. An example system includes a video camera positioned to capture video related to a vehicle structure that blocks a view of the driver. The system also includes a see-through display disposed inside the vehicle between the vehicle structure and the driver. The system also includes a processor configured to determine an eye position of the driver and process the captured video based on the eye position to determine a portion of the captured video to be displayed. The processor is to render the portion of the captured video to create a see-through effect relative to the vehicle structure. To determine the eye position, the processor receives user input for adjusting the portion of the captured video to create a match between the rendered portion and an unobstructed view of the external environment.

20 Claims, 6 Drawing Sheets

(52) U.S. Cl.
CPC .... *B60K 2360/31* (2024.01); *B60W 2540/223* (2020.02); *B60W 2540/225* (2020.02)

(58) Field of Classification Search
CPC ....... B60W 2540/223; B60W 2540/225; G06F 3/013; G06V 20/597; G06V 40/18
See application file for complete search history.

(56) References Cited

U.S. PATENT DOCUMENTS

| | | | | |
|---|---|---|---|---|
| 2008/0012938 | A1* | 1/2008 | Kubota | B60R 1/25 |
| | | | | 348/118 |
| 2008/0151054 | A1* | 6/2008 | Kubota | G06T 15/20 |
| | | | | 348/148 |
| 2008/0258888 | A1* | 10/2008 | Kubota | B60R 1/25 |
| | | | | 340/436 |
| 2010/0253596 | A1* | 10/2010 | Szczerba | G01S 13/867 |
| | | | | 345/7 |
| 2012/0113261 | A1* | 5/2012 | Satoh | G06T 3/4038 |
| | | | | 348/148 |
| 2013/0096820 | A1* | 4/2013 | Agnew | B60R 1/00 |
| | | | | 701/428 |
| 2016/0297362 | A1* | 10/2016 | Tijerina | H04N 23/698 |
| 2017/0349098 | A1* | 12/2017 | Uhm | G02B 27/0101 |
| 2019/0315275 | A1* | 10/2019 | Kim | B60R 1/27 |
| 2021/0162924 | A1* | 6/2021 | Ohyama | G06T 11/203 |
| 2021/0168339 | A1* | 6/2021 | Ohyama | B60K 35/00 |
| 2022/0292841 | A1* | 9/2022 | Corrodi | G06F 3/013 |
| 2022/0363196 | A1* | 11/2022 | Van Den Brink | B60R 99/00 |

\* cited by examiner

USER PERSPECTIVE ALIGNMENT FOR VEHICLE SEE-THROUGH APPLICATIONS

CROSS-REFERENCED TO RELATED APPLICATIONS

This application claims the benefit of U.S. Provisional Application No. 63/133,052, filed on Dec. 31, 2020, the disclosure of which is hereby incorporated by reference in its entirety for all purposes.

FIELD OF THE INVENTION

The present disclosure generally relates to a method, system, and device for providing see-through effects in a vehicle.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

The operation of motor vehicles depends on the driver having good visibility of the environment outside of the vehicle. However, depending on the vehicle's design, there are generally areas of the outside environment that are blocked from view. For example, the frames of most vehicles have structural components that support the vehicle's roof. Such structural components can create blind spots.

SUMMARY

The present disclosure generally relates to techniques for implementing a see-through system for a vehicle. An example system includes a video camera positioned to capture video related to a vehicle structure that blocks a view of the driver, and a see-through display disposed inside the vehicle between the vehicle structure and the driver. The system also includes a processor configured to determine an eye position of the driver, and process the captured video based, at least in part, on the eye position of the driver to determine a portion of the captured video to be displayed on the see-through display. The processor is also configured to render the portion of the captured video to create a see-through effect relative to the vehicle structure. To determine the eye position of the driver, the processor receives user input from the driver for adjusting the portion of the captured video to create a match between the rendered portion and an unobstructed view of the external environment.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Figure 1:
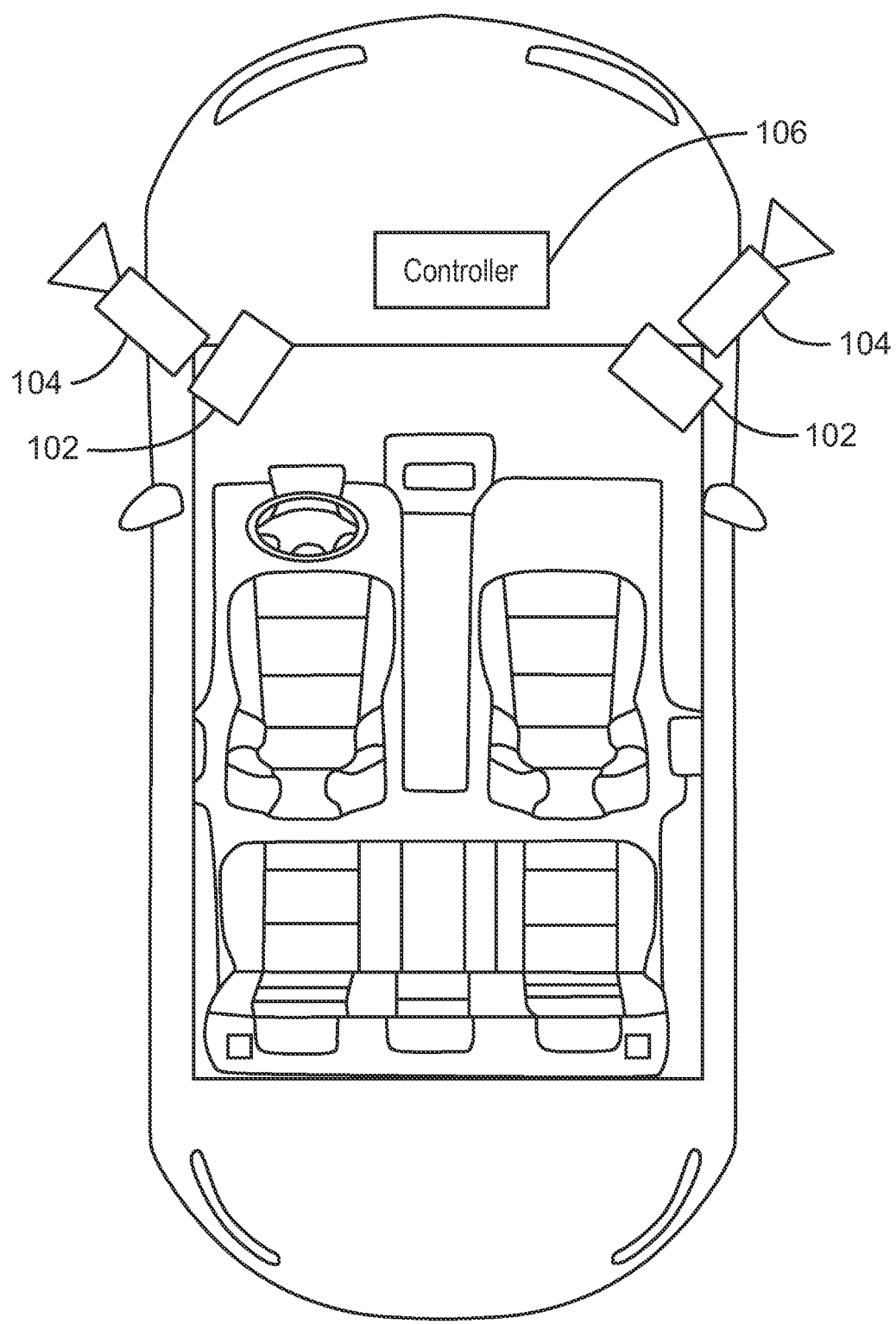
FIG. 1 is an example of a vehicle configured with a see-through system.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

This disclosure describes techniques for providing see-through applications in a vehicle. Most vehicles include structures that tend to block the view of the driver. Examples of such structures include the pillars that support the vehicle's roof. For example, pillars known as "A pillars" are those pillars that hold the windshield in place. The pillars known as "C pillars" are those pillars that hold the vehicle's rear window in place. Some vehicles also have "B pillars" that are positioned at the end of the first door. These support structures have to potential to block the driver's view and create blind spots.

In accordance with embodiments disclosed here, the driver's visibility is enhanced by creating a see-through effect for some vehicle structures. This can be accomplished by placing a display screen inside the vehicle between the vehicle structure and the driver and positioning a camera on the opposite side of the structure outside of the vehicle. The image captured by the camera is then displayed on the display screen to create the illusion that the portion of the vehicle covered by the display screen is see-through, i.e., invisible.

To provide a suitable user experience, the image displayed on the display screen should be oriented so that it matches the perspective of the driver's eyes. Accordingly, the position and size of the image should be determined based on where the driver's eyes are located in the 3D space. Thus, knowing the eye position of the driver is one of the important factors for successfully creating the see-through effect. If eye position information is not available, the see-through application can be implemented using a fixed eye location assumed to be the average position for most people. If the driver's eyes happen to be in that fixed eye location, the driver will still have a good experience. However, the fixed eye location may not be applicable for most people, so most users will not have a good see-through experience.

One way to obtain the eye position needed for the see-through application is to use a dedicated driver monitoring or eye tracking system that tracks the 3D position of the driver's eyes. Various sensors may be deployed to track the eye location, which can then be processed by software algorithms to dynamically update the image on the display to match the user's perspective. However, such an eye tracking system adds additional cost and complexity to the system.

The present disclosure describes techniques wherein the eye position of the driver is determined by user input. In accordance with embodiments, the driver is able to manually adjust the displayed image until the image matches well with the surrounding scenery that is not blocked by a vehicle structure. For example, such manual adjustments may be accomplished using one or more buttons, a joystick, a touchscreen, or other human machine interface. The user's image adjustments are used to derive the user's eye position, which is used to process the image to determine the image alignment. Other inputs, such as default eye position coordinates and seat position, may also be used to determine a default eye position in the absence of user input or in addition to user input.

FIG. 1 is an example of a vehicle configured with a see-through system. Embodiments of the present techniques may be described in the context of a vehicle such as an automobile. However, the techniques may be used in substantially any type of vehicle, including aircraft, watercraft, busses, and others.

As shown in FIG. 1, the system 100 includes two see-through displays 102 positioned inside the vehicle over the A-pillars and oriented to face the interior of the vehicle so as to be visible the driver. Additionally, video cameras 104 are coupled to the A-pillars on outside of the automobile and oriented to face away from the automobile to capture the view blocked by the A-pillars.

The system 100 also includes a controller 106. The controller 106 may be implemented as processing hardware or a combination or hardware and software. For example, the controller 106 may be implemented on a microprocessor such as an Application Specific Integrated Circuit (ASIC), as software or firmware executing on a general purpose processor, and the like. The controller 106 can also include electronic memory for storing instructions and data, such as pre-programmed data and/or data collected from sensors in the vehicle. Additionally, the controller 106 may be a dedicated controller that is dedicated to the see-through application, or the controller 106 may be implemented as a feature of a general purpose automobile computing system such as the automobile's infotainment head unit.

Video data from the cameras 104 is sent to the controller 106, processed by the controller 106, and sent from the controller 106 to the displays 102 for rendering. The processing of the video data includes determining what segment of the video captured by the cameras 104 is sent to the displays 102, which depends, at least in part, on the current eye position coordinates being used by the controller 106 at any given moment. Techniques for determining the eye position of the driver are described further below.

Although the example system 100 shown in FIG. 1 includes two see-through displays 102 positioned to provide a see-through effect relative to the automobiles A-Pillars, it will be appreciated that other configurations are also possible. For example, the system 100 can include a single see-through display or multiple see-through displays. Additionally, the see-through displays may be positioned in relation to any other vehicle structure that blocks the driver's view, such as the B-pillars, the C-pillars, the doors, the hood, and others.

Figure 2A:
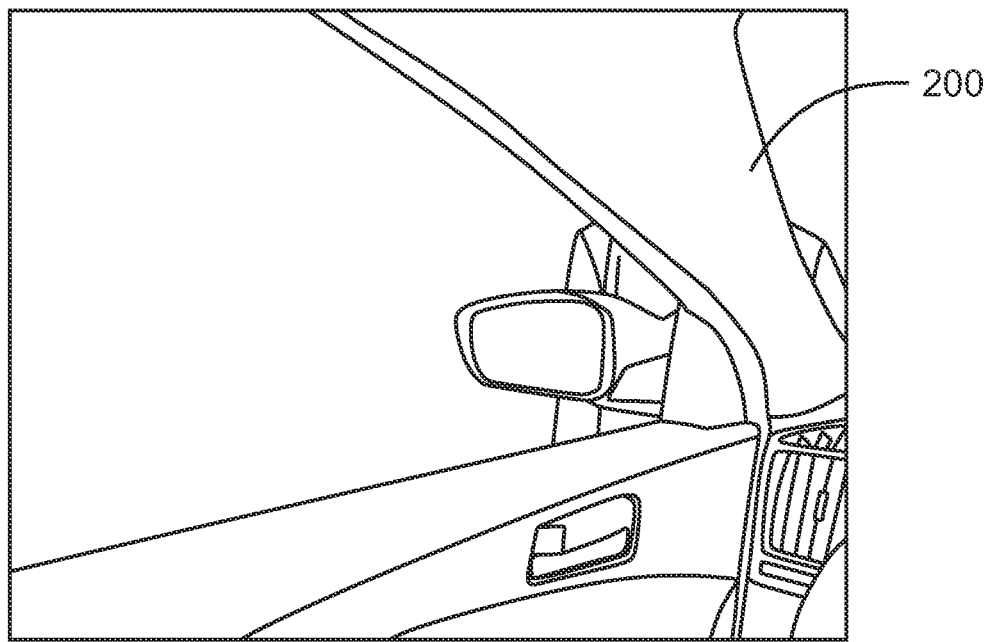
FIG. 2A shows a driver perspective from inside a vehicle without a see-through display.

FIG. 2A shows a driver perspective from inside a vehicle without a see-through display. As shown in FIG. 2A, there appears to be an object outside the vehicle, but the view is obstructed by the A-pillar 200. From this, it can be appreciated that the driver's view is obstructed such that the driver may not realize that there is an object in close proximity to the vehicle.

Figure 2B:
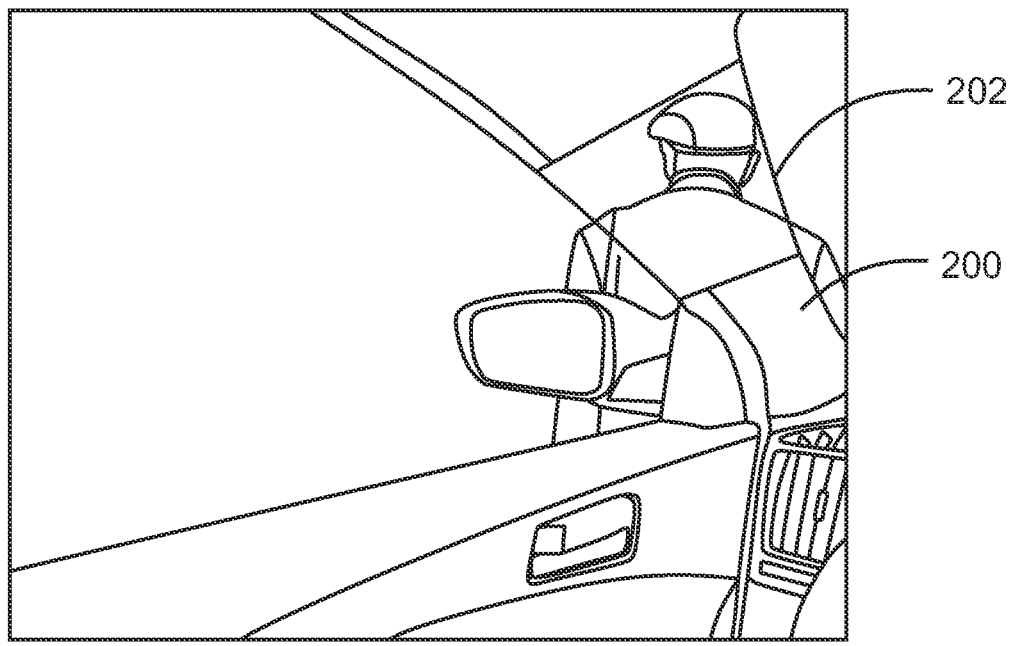
FIG. 2B shows the driver perspective from inside a vehicle with a see-through display positioned in relation to the A-pillar.

FIG. 2B shows the driver perspective from inside a vehicle with a see-through display positioned in relation to the A-pillar. As shown in FIG. 2B, the portion of the A-pillar 200 covered by the display 202 now appears to be transparent. This allows the driver to more easily recognize that there is a person in close proximity to the vehicle and can exercise an appropriate degree of caution. To create the illusion of transparency, the video rendered on the display 202 should align closely with the real-world view that is not obstructed by the A-pillar. To achieve this close alignment, the video displayed may be adjusted depending on the position of the driver's eyes.

Figure 3A:
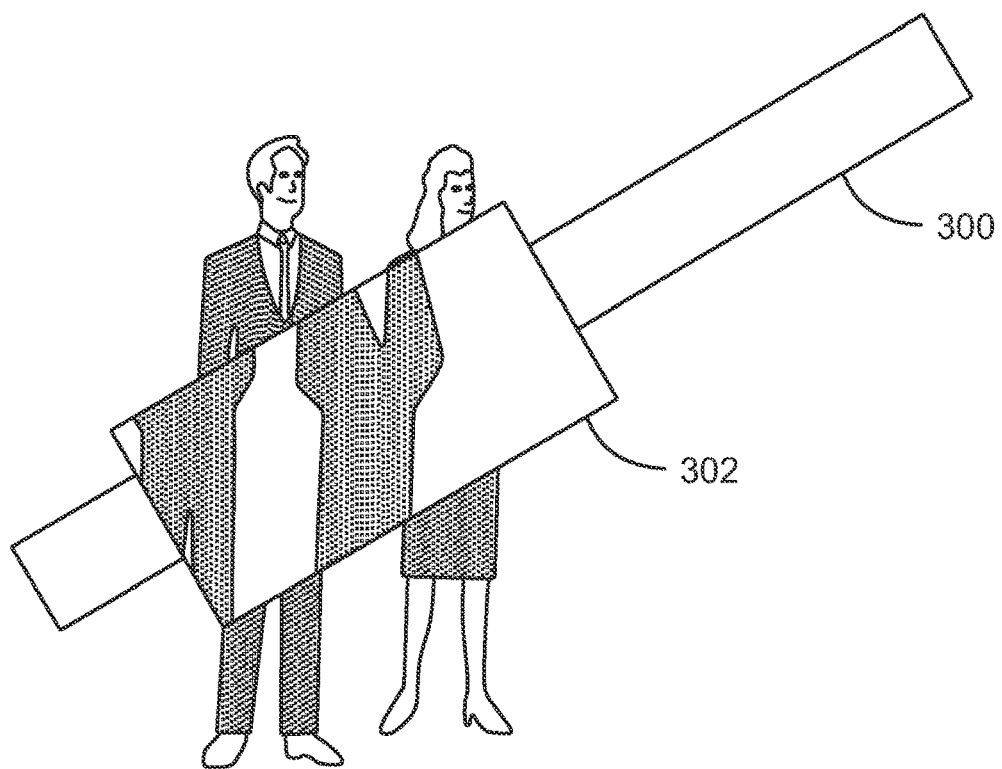
FIGS. 3A and 3B are illustrations demonstrating the alignment process to be performed by the driver.
Figure 3B:
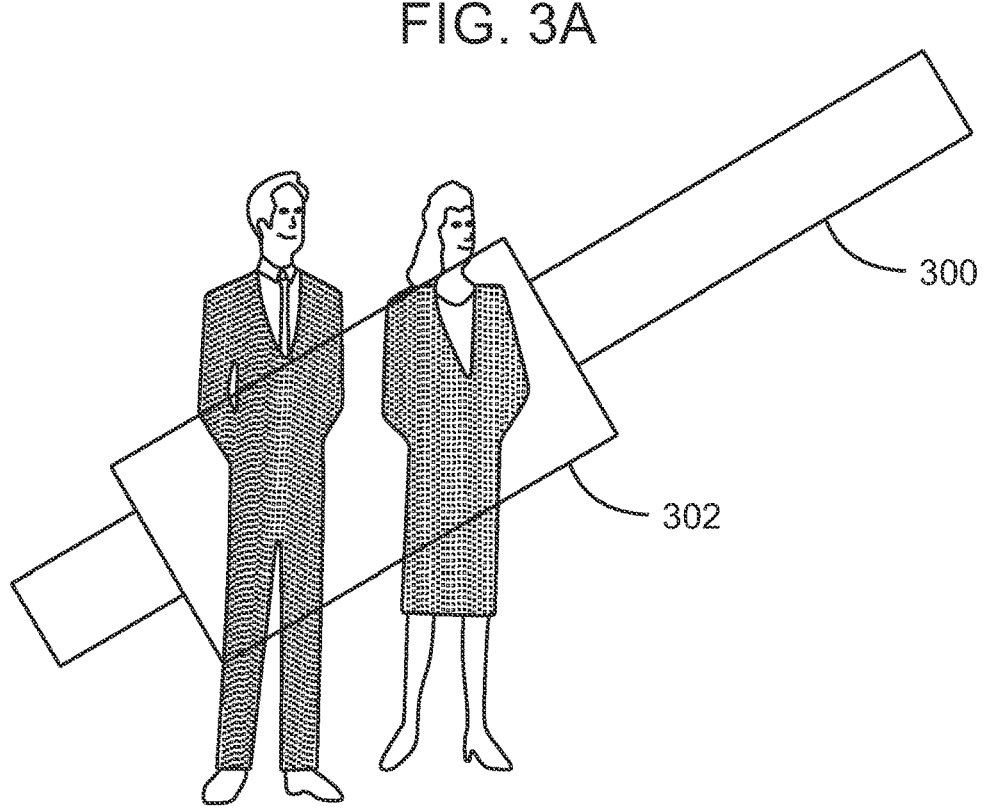

FIGS. 3A and 3B are illustrations demonstrating the alignment process to be performed by the driver. As seen in FIG. 3A, the A-pillar 300 of the vehicle is obstructing the driver's view of the area outside the vehicle. The display screen 302 is displaying the video captured by the external camera. However, the displayed image is not properly aligned with the driver's real-world view of the unobstructed scenery. This indicates that the eye position coordinates currently being used to process the video images do not match the actual eye position of the driver. To adjust the image, the driver can adjust the image manually using a user input device in the vehicle. In this case, the user would adjust the image to move the displayed image to the right. In other cases, the user adjustments can include moving the picture up or down, left or right, or zooming in or out. Each adjustment input by the user changes the eye position coordinates used to process the video images.

FIG. 3B shows the alignment of the displayed video once the user has obtained a suitable match between the displayed video and the scenery not blocked by the A-pillar 300. This indicates that the eye position coordinates currently being used to process the video images are a good match for the actual eye position of the driver. In some embodiments, the current eye position coordinates are also used to process the video images rendered on other see-through displays. For example, if the vehicle includes a second see-through display on the other A-pillar, the current eye position coordinates are also used for the alignment of that display. In this way, the driver can simultaneously adjust all of the see-through displays in the vehicle, rather than adjusting each display separately.

Figure 4:
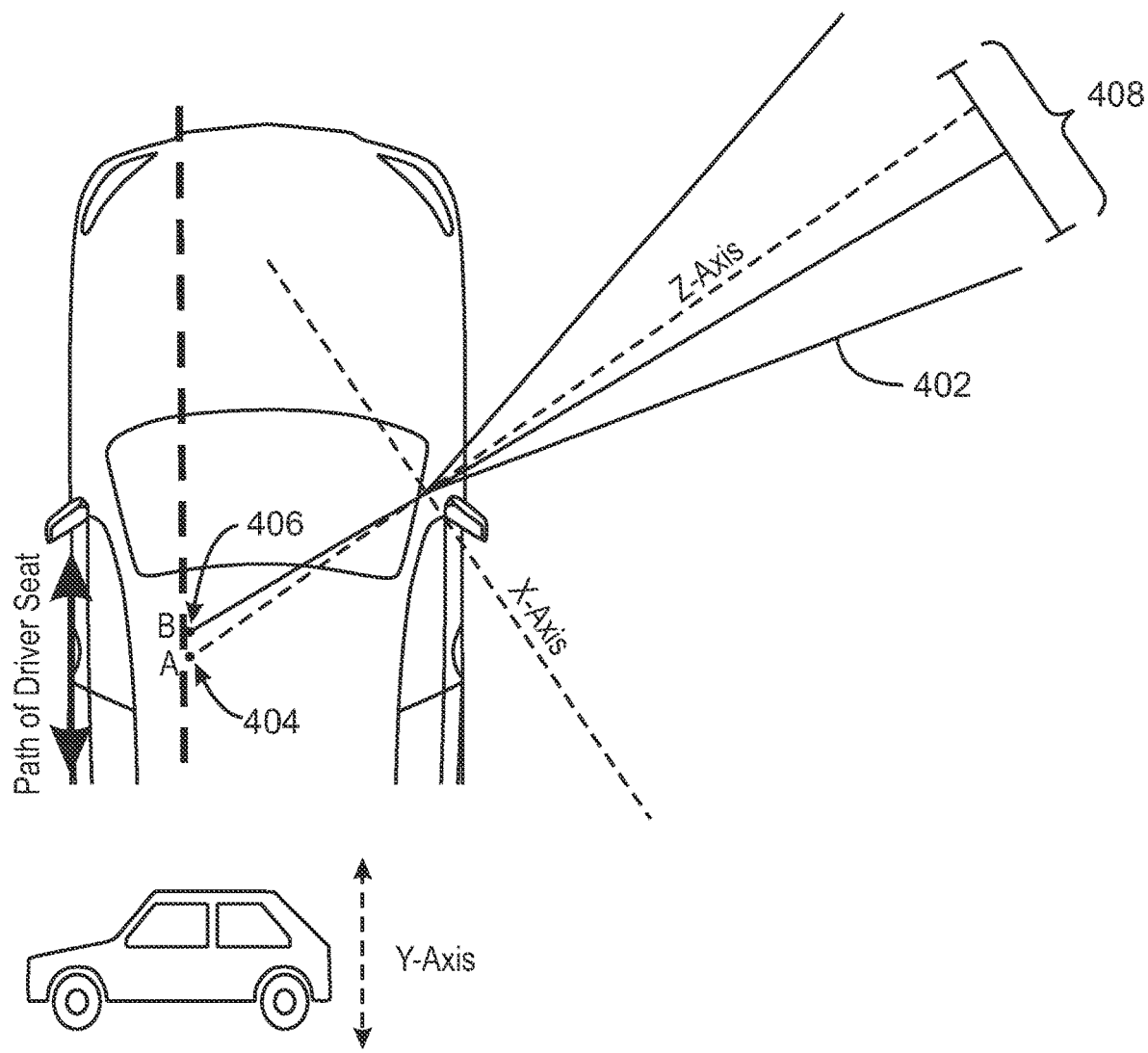
FIG. 4 is a top view of a vehicle illustrating a technique for adjusting the eye position of a driver in accordance with embodiments.

FIG. 4 is a top view of a vehicle illustrating a technique for adjusting the eye position of a driver in accordance with embodiments. FIG. 4 shows an example coordinate system that may be used by the see-through system. The origin of the coordinate system is centered on the video camera and includes an X-axis, Y-axis and Z-axis. The coordinate system is oriented such that the Z-axis runs through the center of the field of view of the camera, which is represented by the cone 402.

Point A 404 represents an initial eye position. The coordinates of the initial eye position may be based on an average eye position determined to be suitable for a large number of people. For example, the initial Y coordinate may be determined based on the average expected height of drivers. The initial X and Z coordinates may be selected based on the average expected eye position for drivers based on average physical features such as leg length. The initial eye position may also be determined based in part on a position of the seat. If the seat is moved forward or backward, the X and Z coordinates for the initial eye position may be adjusted accordingly. The initial eye position may also be determined in part using user defined presets and/or learned behavior as described further below in relation to FIG. 5

To adjust the displayed image, the driver can provide inputs that change the current eye position coordinates. In the example system of FIG. 4, shifting the image to the left or right will cause the eye position coordinates to be shifted along the X-axis, shifting the image up or down will cause the eye position coordinates to be shifted along the Y-axis, and increasing or decreasing the size of the image (zooming in or out) will cause the eye position coordinates to be shifted along the Z-axis.

Point B 406 represents a current eye position coordinate as adjusted by the user. To get from point A to point B, the driver will have adjusted the displayed image to the right and zoomed out. Although not shown, a height adjustment may have also been made. If the driver is finished adjusting the displayed video image, then Point B will represent the actual eye position of the driver or a close approximation that provides a good match as viewed by the driver. The line segment 408 shows the portion of the video image that will be displayed with the eye position coordinates set at point B. As shown, a straight line from the current eye position coordinates (point B 406) passes through the origin (the camera location) and through the center of the displayed portion of the video image.

Figure 5:
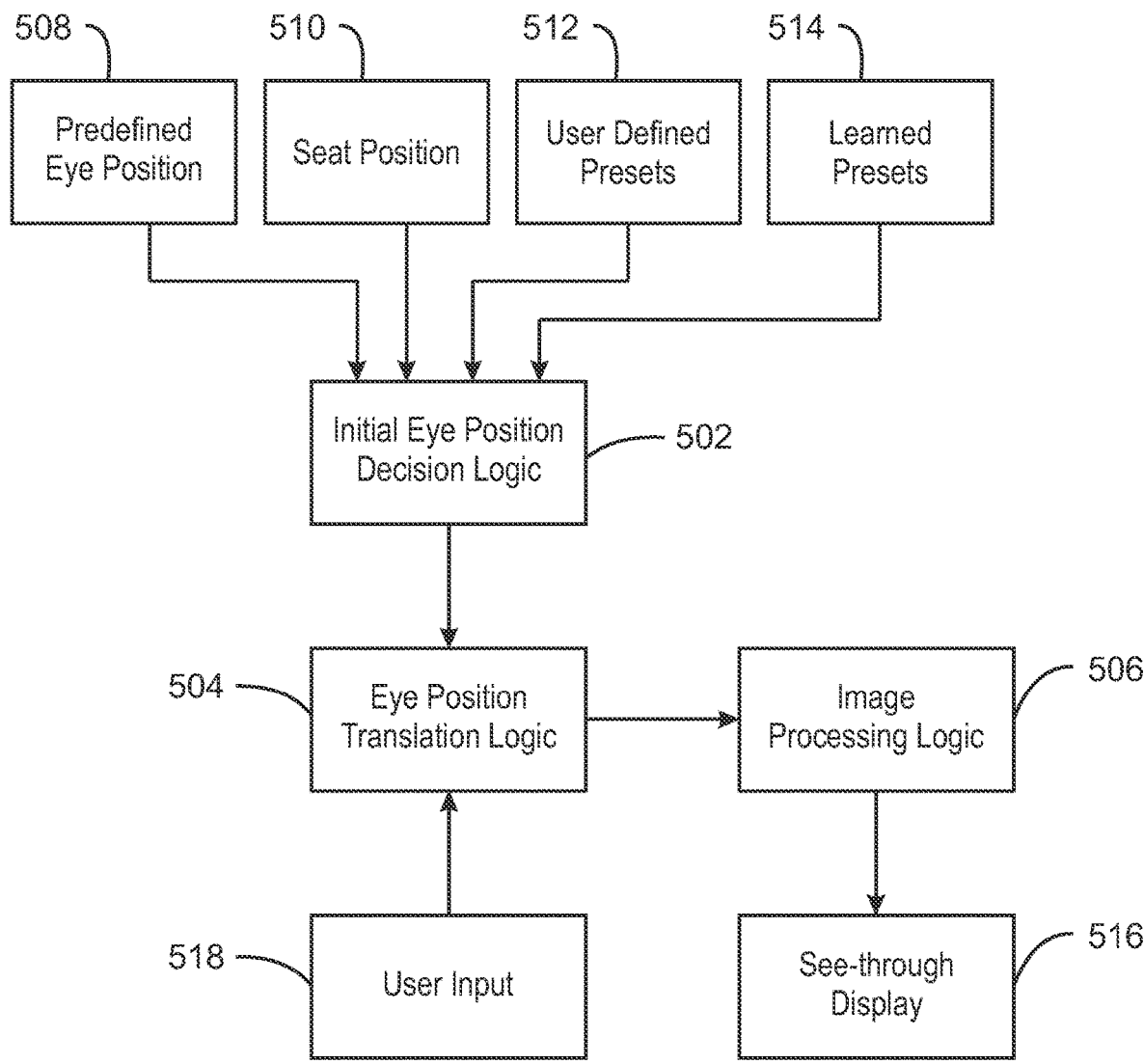
FIG. 5 is a block diagram of a system for implementing a see-through display for a vehicle in accordance with embodiments.

FIG. 5 is a block diagram of a system for implementing a see-through display for a vehicle in accordance with embodiments. The system 500 may be implemented in any suitable computer logic, including processing hardware or a combination or hardware and software. At least some of the blocks may be included in the controller 106 of FIG. 1.

The system 500 includes initial eye position logic 502, eye position translation logic 504, and image processing logic 506. The initial eye position logic 502 determines initial eye position coordinates that will be used in the event that user input adjustments have not been provided or are otherwise not available. The initial eye position coordinates may be determined based on various input data, including one or more of the following: a predefined eye position 508; a seat position 510; a user defined preset 512; and a learned preset 514. Each of these input data may be stored to electronic memory and retrieved by the initial eye position logic 502.

The predefined eye position 508 is a set of default eye position coordinates that may be pre-programmed by manufacturer, for example. This predefined eye position 508 may be determined to be a good average eye position most suitable for a large number of people. The predefined eye position 508 may be a specified set of coordinates that are constant relative to the camera 104 (FIG. 1) or the coordinate system shown in FIG. 4. In some embodiments, the predefined eye position 508 is a specified set of coordinates that are constant relative to the position of the driver's seat, i.e., seat position 510. The seat position 510 may be provided by on one or more sensors in the vehicle. In some embodiments, the initial eye position logic 502 receives the predefined eye position 508 and the seat position 510 and calculates the initial eye position from this information.

The user defined presets 512 refers to eye position coordinates that have been specified by the driver. After adjusting the video images to the desired orientation, the user can save the current positioning for later use by pressing a preset button, for example. The current eye position coordinates can then be stored to electronic memory as a user defined preset and reused when requested by the driver. The user defined preset may also include information regarding other adjustable features of the vehicle, such as the driver's seat adjustments, mirror adjustments, and steering wheel adjustments. In this way, activation of a user defined preset can implement a variety of pre-defined adjustments including the eye position coordinates. In some embodiments, the activation of a user defined preset will cause the initial eye positon decision logic 502 to implement the user defined eye position coordinates in place of the predefined eye position 508.

The learned presets 514 refer to eye position presets that have been determined through machine learning techniques based on observation of user behavior. The controller can monitor user behavior and apply machine learning techniques to identify suitable eye position coordinates to be used. The monitoring of user behavior can include identifying the eye position coordinates specified by the driver over time. For example, in some cases, the driver may regularly adjust the eye position coordinates to a same position. In such cases, the controller can specify this regularly chosen eye position as a learned preset. In cases in which multiple drivers regularly use the vehicle, the controller can identify multiple learned presets that may be applied during appropriate times. For example, observation of user behavior may reveal that the eye position coordinates are set to a first position during first time frame (e.g., time of day or day of week) and set to a second position during a second time frame. This would indicate that different drivers are operating the vehicle at certain predictable times. Accordingly, the learned presets 514 can be implemented so that the correct eye position coordinates are applied during the correct time frames.

After the initial eye position logic 502 determines the initial eye position coordinates, the coordinates are sent to the eye position translation logic 504. The eye position translation logic 504 sends the current eye position coordinates to the image processing logic 506, which uses the current eye position coordinates to process the video image to determine what portion of the video images captured by the video camera is to be rendered on the see-through display 516.

While the see-through system 500 is operating, the user can make adjustments to the displayed images as described above, resulting in user input 518. The user input 518 can be received from one or more buttons, joystick, or a graphical user interface of a display screen, for example. The user input 518 is received by the eye position translation logic 504, which uses the user input to adjust the current eye position coordinates and sends the new eye position coordinates to the image processing logic 506. In some embodiments, initial eye position coordinates in use when the vehicle is turned off may be carried over to be used the next time the vehicle is restarted.

Simplified examples are presented herein. However the teachings shown here can be extrapolated beyond the examples shown to include any number of different functionalities. Additionally, it is to be understood that the block diagram of FIG. 5 is not intended to indicate that the system 500 is to include all of the components shown in FIG. 5. Rather, the system 500 can include fewer or additional components not illustrated in FIG. 5.

Figure 6:
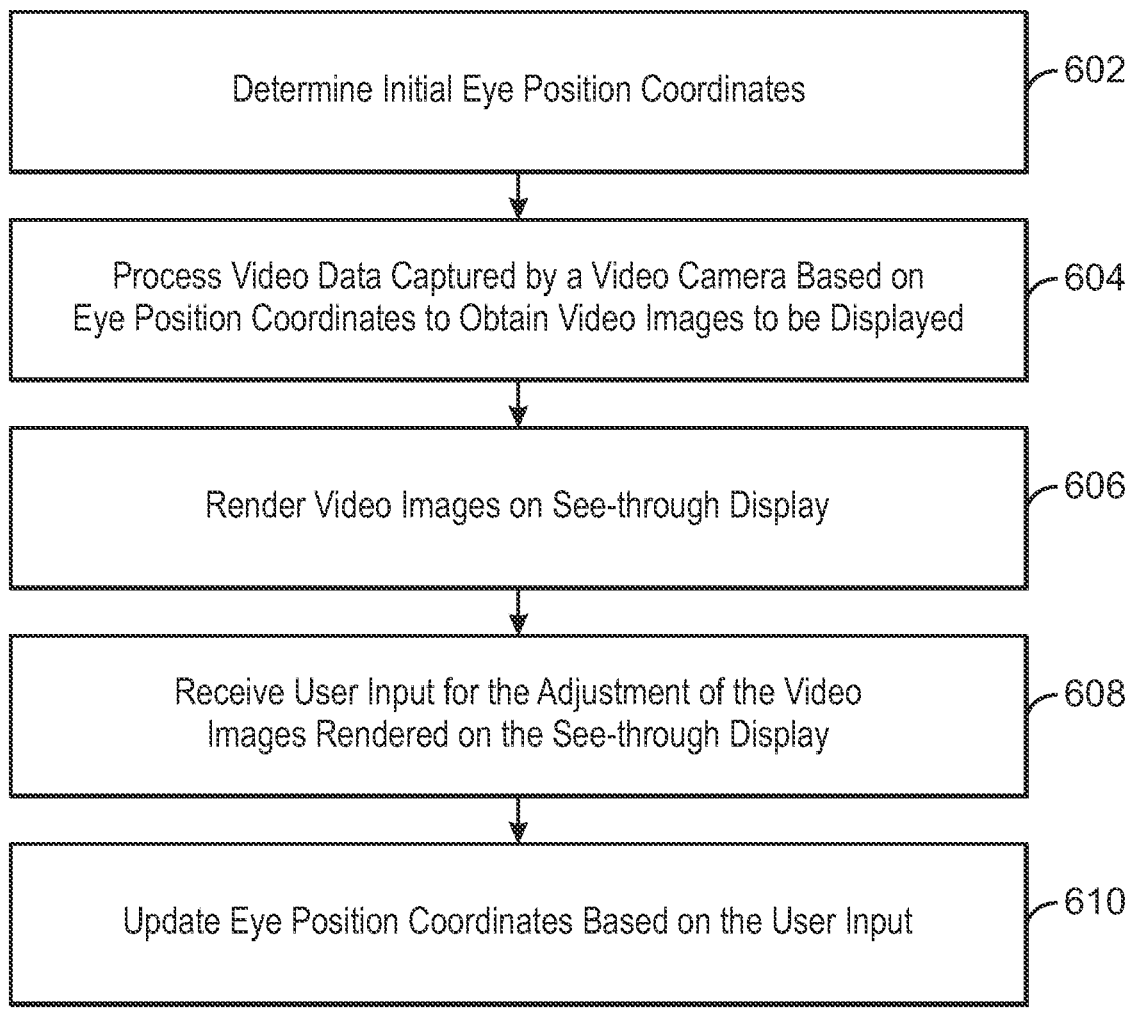
FIG. 6 is a process flow diagram of an example method for operating a see-through display for a vehicle.

FIG. 6 is a process flow diagram of an example method for operating a see-through display for a vehicle. Each of the functions of this method 600 can be performed by individual components, in parallel, and/or in an ongoing basis to form a pipeline of continuously updating information and actions. The method 600 may be performed by the controller 106 shown in FIG. 1 and implemented by logic embodied in hardware, such as logic circuitry or one or more processors configured to execute instructions stored in a non-transitory, computer-readable medium. The method may begin at block 602.

At block 602, initial eye position coordinates are determined. The initial eye position coordinates may be determined when the see-through system is activated. The see-through system may be activated manually by the user, when the vehicle is started, or when the vehicle is put in gear, for example. As described above, the initial eye position coordinates may be determined based on a pre-defined eye position, a seat position, a user defined preset, a learned preset, and others.

At block 604, video captured by the see-through system's video camera is processed using the eye position coordinates. The eye position coordinates are used to determine what portion of the captured video is to be rendered on the see-through display. In some embodiments, additional factors may also be used to determine what portion of the captured video to display, such as the distance of objects within the captured video.

At block 606, the video images generated at block 604 are rendered to the see-through display. At this stage, the video images may be misaligned with the external environment due to a possible mismatch between the eye position coordinates used to process the captured video at block 604 and the actual position of the driver's eyes.

At block 608, user input is received for the adjustment of the video images rendered on the see-through display. The user input adjustments cause the portion of the displayed video to shift relative to the captured video. For example, the user adjustments may cause an upward shift, downward shift, leftward shift, rightward shift, or a zoom in our out.

At block 610, the eye position coordinates are updated in accordance with the user inputs. The process flow then returns to block 604 and the captured video is processed using the updated eye position coordinates. The processing performed at block 604 causes the visual shift in the displayed images, which provides the visual feedback that the user uses to provide the user input at block 606.

The method 600 should not be interpreted as meaning that the blocks are necessarily performed in the order shown. Furthermore, fewer or greater actions can be included in the method 600 depending on the design considerations of a particular implementation.

While the invention may be susceptible to various modifications and alternative forms, specific embodiments have been shown by way of example. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A see-through system for a vehicle, comprising:
a video camera positioned to capture video related to a vehicle structure that blocks a view of a driver of the vehicle;
a see-through display screen disposed on an inside of the vehicle between the vehicle structure and the driver; and
a processor configured to:
determine an eye position of the driver;
process the captured video based, at least in part, on the eye position of the driver to determine a portion of the captured video to be displayed on the see-through display screen; and
render the portion of the captured video to create a see-through effect relative to the vehicle structure;
wherein to determine the eye position of the driver comprises receiving user input from the driver for adjusting the portion of the captured video to create a match between the rendered portion and an unobstructed view of the external environment.

2. The see-through system of claim 1, wherein the user input comprises instructions to move the portion of the captured video up or down, left or right, and zoom in or out.

3. The see-through system of claim 1, wherein to determine the eye position of the driver comprises to determine initial eye position coordinates before receiving the user input.

4. The see-through system of claim 3, wherein the initial eye position coordinates are predefined eye position coordinates that are specified relative to the video camera.

5. The see-through system of claim 3, wherein the initial eye position coordinates are predefined eye position coordinates that are specified relative to a seat position, and wherein the initial eye position coordinates are determined based on the seat position.

6. The see-through system of claim 3, wherein the initial eye position coordinates are determined from a user defined preset.

7. The see-through system of claim 3, wherein the initial eye position coordinates are determined from a learned preset acquired by analyzing behavior of the user over time.

8. The see-through system of claim 1, wherein the vehicle structure that blocks the view of the driver is an A-pillar.

9. The see-through system of claim 1, wherein the vehicle structure that blocks the view of the driver is a first A-pillar, the see-through system further comprising:
a second video camera positioned to capture video related to a second A-pillar; and
a second see-through display screen disposed inside the vehicle between the second A-pillar and the driver.

10. A method of operating a see-through system for a vehicle comprising:
determining an eye position of a driver;
processing captured video based, at least in part, on the eye position of the driver to determine a portion of the captured video to be displayed on a see-through display screen disposed on an inside of the vehicle and positioned between the driver and a vehicle structure that blocks the driver's view of the external environment; and
rendering the portion of the captured video to create a see-through effect relative to the vehicle structure;
wherein determining the eye position of the driver comprises receiving user input from the driver for adjusting the portion of the captured video to create a match between the rendered portion and an unobstructed view of the external environment.

11. The method of claim 10, wherein determining the eye position of the driver comprises determining initial eye position coordinates before receiving the user input.

12. The method of claim 11, wherein the initial eye position coordinates are predefined eye position coordinates that are specified relative to a video camera used for capturing the captured video.

13. The method of claim 11, wherein the initial eye position coordinates are predefined eye position coordinates that are specified relative to a seat position, and wherein the initial eye position coordinates are determined based on the seat position.

14. The method of claim 11, wherein the initial eye position coordinates are determined from a user defined preset.

15. The method of claim 11, wherein the initial eye position coordinates are determined from a learned preset acquired by analyzing behavior of the user over time.

16. The method of claim 10, wherein the vehicle structure that block the driver's view of the outside environment is an A-pillar.

17. A non-transitory computer-readable medium comprising instructions to direct the actions of a processor to operate a see-through system of a vehicle, the instructions to direct the processor to:
    determine an eye position of a driver;
    process captured video based, at least in part, on the eye position of the driver to determine a portion of the captured video to be displayed on a see-through display screen disposed on an inside of the vehicle and positioned between the driver and a vehicle structure that blocks the driver's view of the external environment; and
    render the portion of the captured video to create a see-through effect relative to the vehicle structure;
    wherein to determine the eye position of the driver comprises to receive user input from the driver for adjusting the portion of the captured video to create a match between the rendered portion and an unobstructed view of the external environment.

18. The non-transitory computer-readable medium of claim 17, wherein to determine the eye position of the driver comprises obtaining initial eye position coordinates that are predefined eye position coordinates that are specified relative to a video camera used to capture the captured video.

19. The non-transitory computer-readable medium of claim 17, wherein to determine the eye position of the driver comprises obtaining initial eye position coordinates according to a sensed seat position and predefined eye position coordinates that are specified relative to the seat position.

20. The non-transitory computer-readable medium of claim 17, wherein to determine the eye position of the driver comprises obtaining initial eye position coordinates from a user defined preset or a learned preset acquired by analyzing behavior of the user over time.

* * * * *